United States Patent
Hess, III et al.

[11] Patent Number: 6,131,806
[45] Date of Patent: Oct. 17, 2000

[54] DISPENSING STRUCTURE INCORPORATING A VALVE-CONTAINING FITMENT FOR MOUNTING TO A CONTAINER AND A PACKAGE WITH A DISPENSING STRUCTURE

[75] Inventors: John M. Hess, III; Stuart R. Brown, both of Midland; Joel R. Robinson, Bay City; Timothy R. Socier, Essexville, all of Mich.

[73] Assignee: AptarGroup, Inc., Crystal Lake, Ill.

[21] Appl. No.: 09/501,669

[22] Filed: Feb. 10, 2000

Related U.S. Application Data

[62] Division of application No. 09/196,301, Nov. 19, 1998, Pat. No. 6,050,451.

[51] Int. Cl.[7] .................................................. B65D 17/40
[52] U.S. Cl. .................... 229/216; 229/217; 229/125.04; 229/125.14; 222/153.06; 222/490
[58] Field of Search .................................. 229/216, 217, 229/219, 125.04, 125.14, 125.15; 222/92, 94, 105, 107, 153.14, 153.05–153.07, 541.6, 541.9, 490

[56] References Cited

U.S. PATENT DOCUMENTS

| | | | |
|---|---|---|---|
| 919,838 | 4/1909 | Eaton | 229/125.14 |
| 1,989,714 | 2/1935 | Statham . | |
| 1,996,156 | 4/1935 | Janssen . | |
| 3,235,128 | 2/1966 | Hansen | 222/107 |
| 3,265,282 | 8/1966 | Maxwell | 229/125.14 X |
| 3,669,323 | 6/1972 | Harker et al. . | |
| 4,553,971 | 11/1985 | Ashley et al. | 222/107 X |
| 4,629,080 | 12/1986 | Carveth | 222/107 X |
| 4,640,425 | 2/1987 | Cabernoch | 222/107 X |
| 4,728,006 | 3/1988 | Drobish et al. . | |
| 4,732,299 | 3/1988 | Hoyt | 222/107 X |
| 4,749,108 | 6/1988 | Dornbusch et al. . | |
| 4,794,750 | 1/1989 | Schmidt et al. . | |
| 4,830,205 | 5/1989 | Hammond et al. | 222/107 X |
| 4,964,562 | 10/1990 | Gordon . | |
| 4,969,581 | 11/1990 | Seifert et al. . | |
| 4,991,745 | 2/1991 | Brown . | |
| 4,998,646 | 3/1991 | Sherman | 222/107 |
| 5,005,734 | 4/1991 | Van Gordon et al. | 222/107 |
| 5,033,655 | 7/1991 | Brown . | |
| 5,065,938 | 11/1991 | Anderson | 229/125.15 X |

(List continued on next page.)

FOREIGN PATENT DOCUMENTS

| | | |
|---|---|---|
| 160336 | 11/1985 | European Pat. Off. . |
| 297 06 159 U 1 | 4/1997 | Germany . |
| 29706158 U1 | 4/1997 | Germany . |
| 1474620 | 5/1977 | United Kingdom . |
| WO 96/38349 | 5/1996 | WIPO . |
| WO 97/08979 | 3/1997 | WIPO . |

OTHER PUBLICATIONS

U.S. Pat; Application Ser. No. 08/915,960 assigned to Aptar-Group, Inc.

Primary Examiner—Kenneth Bomberg
Attorney, Agent, or Firm—Rockey, Milnamow & Katz, Ltd.

[57] ABSTRACT

A dispensing structure, and a package with a dispensing structure, is provided with a valve. In one embodiment, the dispensing structure is a multi-piece fitment. The multi-piece fitment includes a base for mounting to the container and a valve carrier for mounting to the base. A flexible, self-sealing slit-type valve is mounted within the carrier. In another embodiment, a fitment is mounted in the opening of a thin-walled, flexible, collapsible container, and the flexible valve is mounted in the fitment. In yet another embodiment, a package includes a container having a corner wall defining an opening, and a fitment is sealingly mounted to the corner wall at the opening. A valve is disposed within the fitment. A removable and disposable cover extends from the container over the fitment and at least a portion of the corner wall to define a hermetically sealed volume around the fitment. The cover may be pulled away from the container to expose the fitment.

9 Claims, 8 Drawing Sheets

U.S. PATENT DOCUMENTS

| | | | |
|---|---|---|---|
| 5,076,493 | 12/1991 | Anderson | 229/125.15 |
| 5,115,950 | 5/1992 | Rohr . | |
| 5,176,313 | 1/1993 | Curry et al. | 229/125.15 |
| 5,193,712 | 3/1993 | Küppersbusch . | |
| 5,213,236 | 5/1993 | Brown et al. . | |
| 5,271,531 | 12/1993 | Rohr et al. . | |
| 5,307,955 | 5/1994 | Viegas . | |
| 5,339,995 | 8/1994 | Brown et al. . | |
| 5,350,110 | 9/1994 | Will | 229/125.15 |
| 5,377,877 | 1/1995 | Brown et al. . | |
| 5,409,144 | 4/1995 | Brown . | |
| 5,439,143 | 8/1995 | Brown et al. . | |
| 5,680,969 | 10/1997 | Gross . | |
| 5,873,491 | 2/1999 | Garcia et al. | 222/95 |
| 5,911,340 | 6/1999 | Uematsu | 222/92 |
| 5,975,414 | 11/1999 | Stacy-Ryan et al. | 229/125.15 |

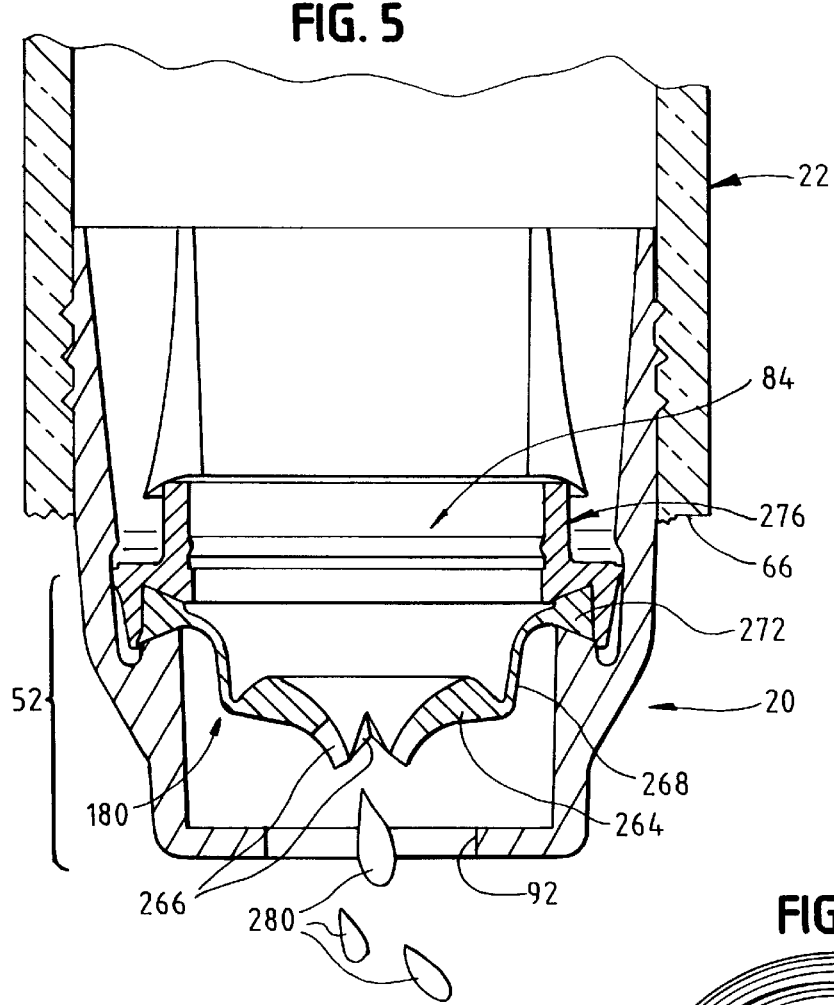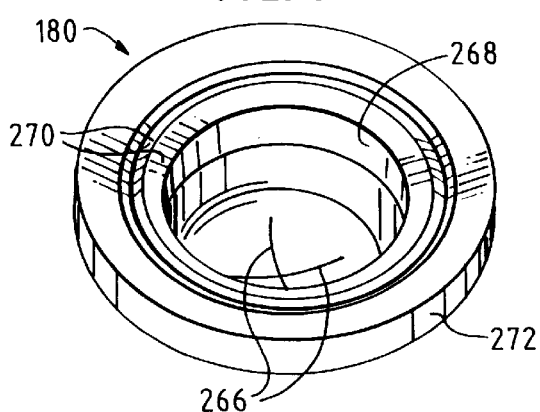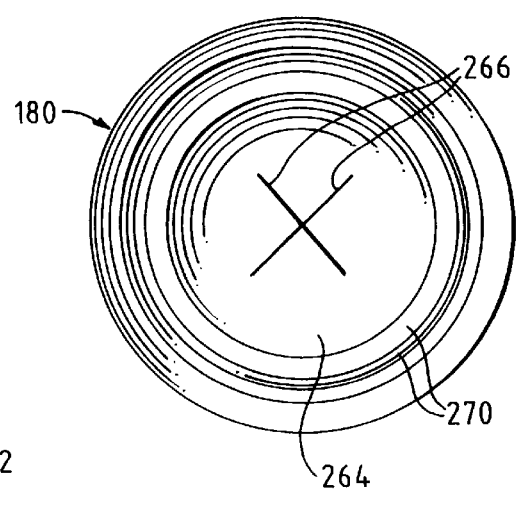

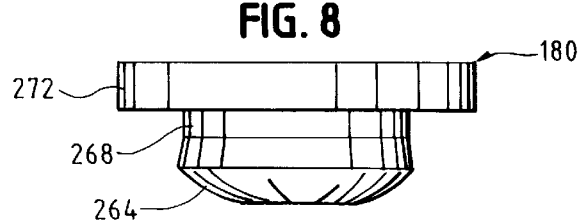
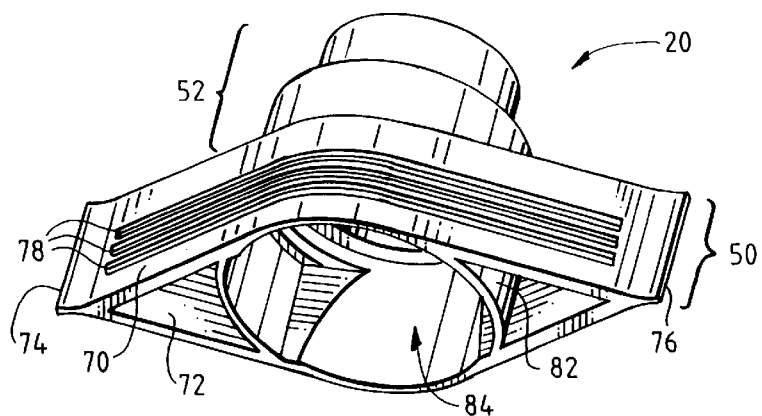
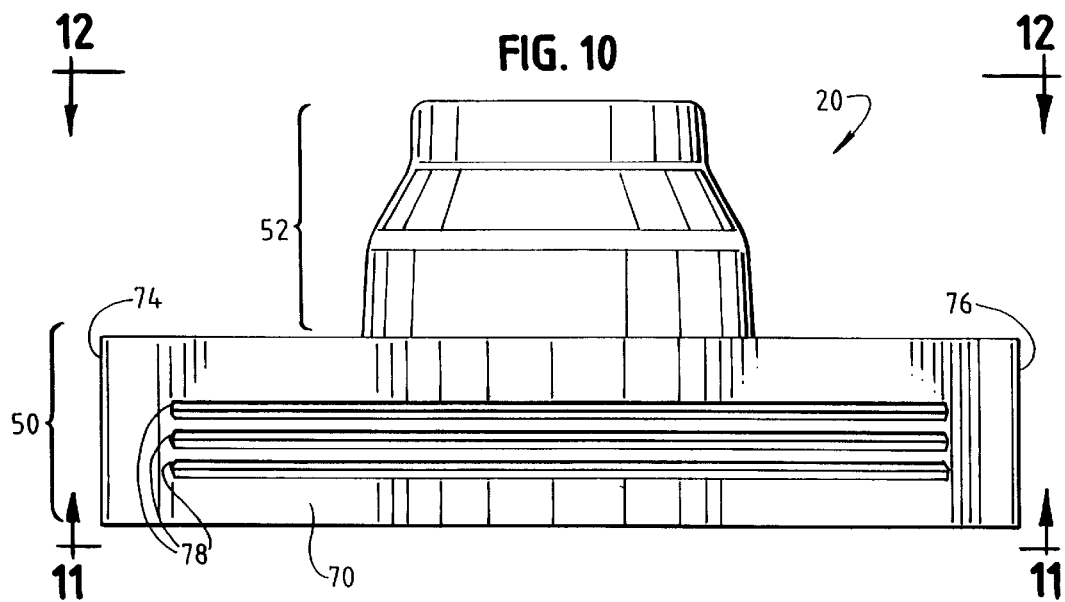

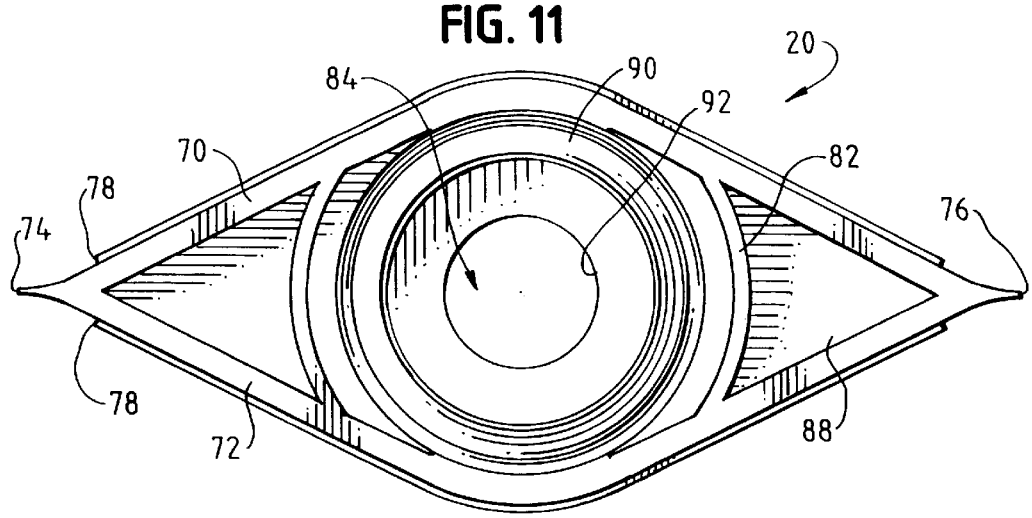
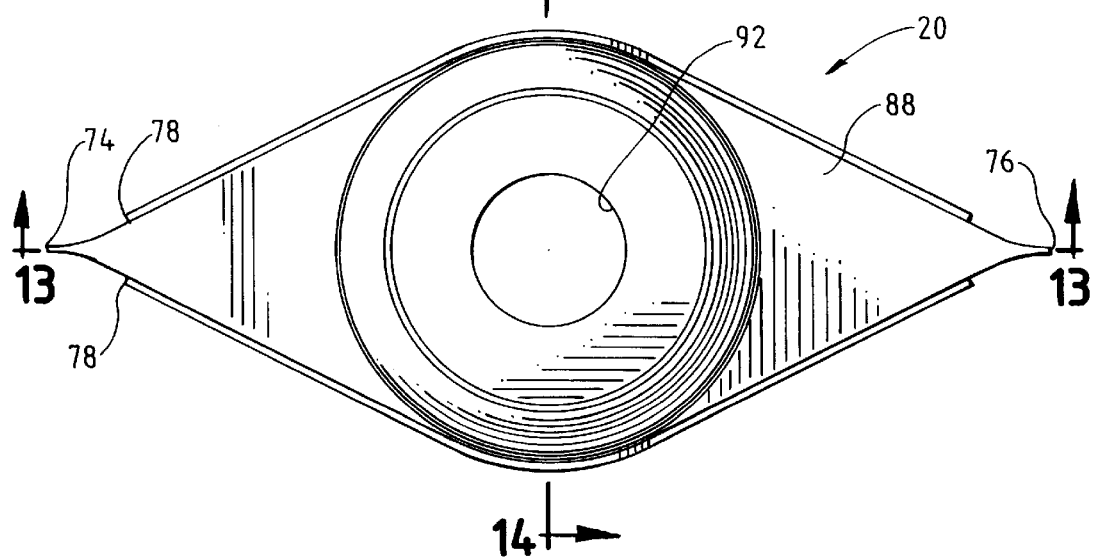

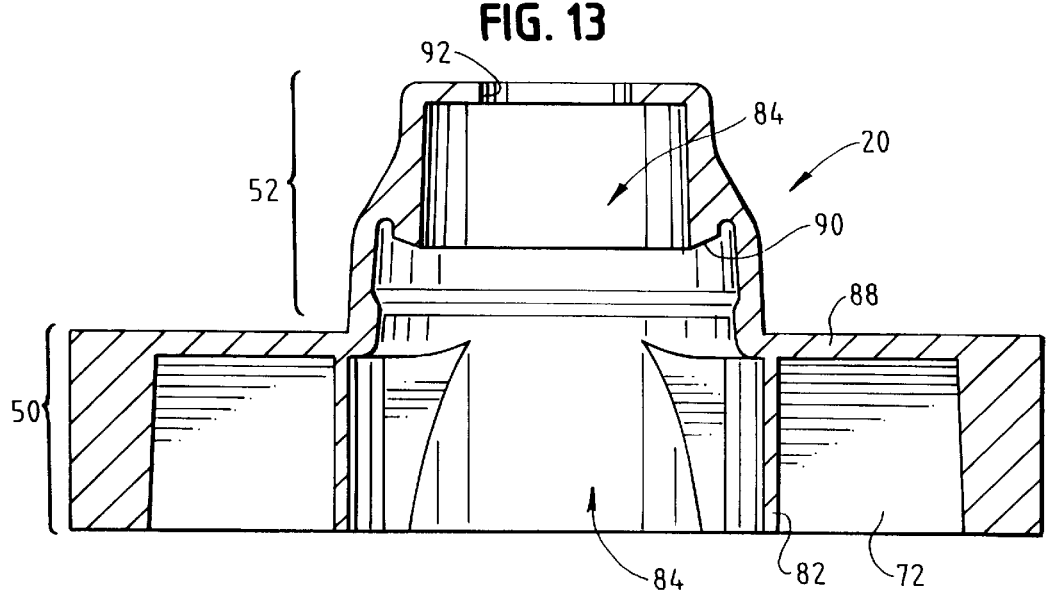
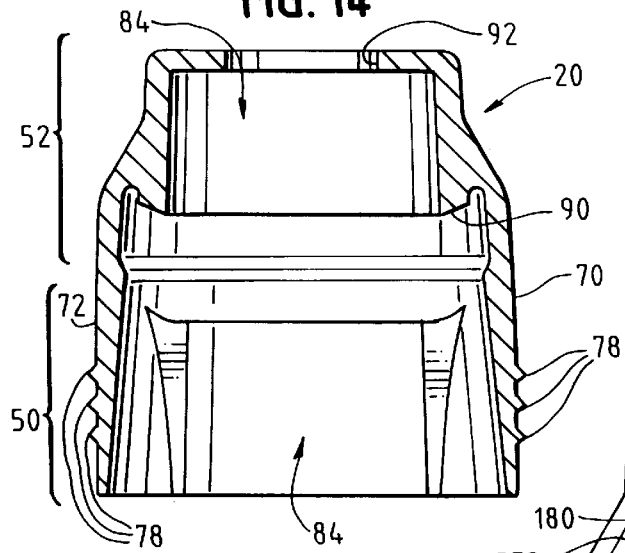
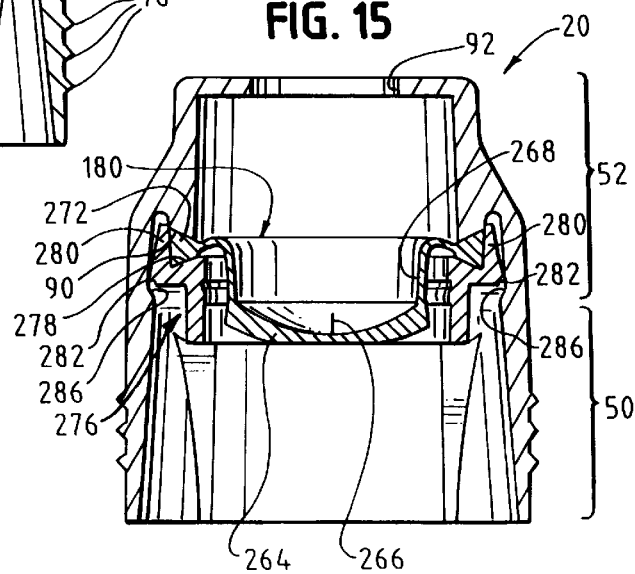

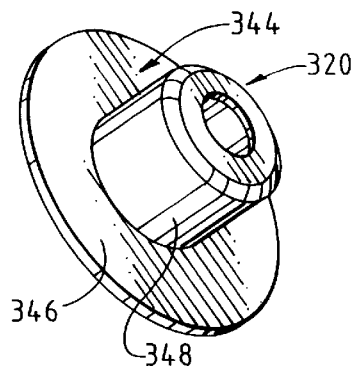
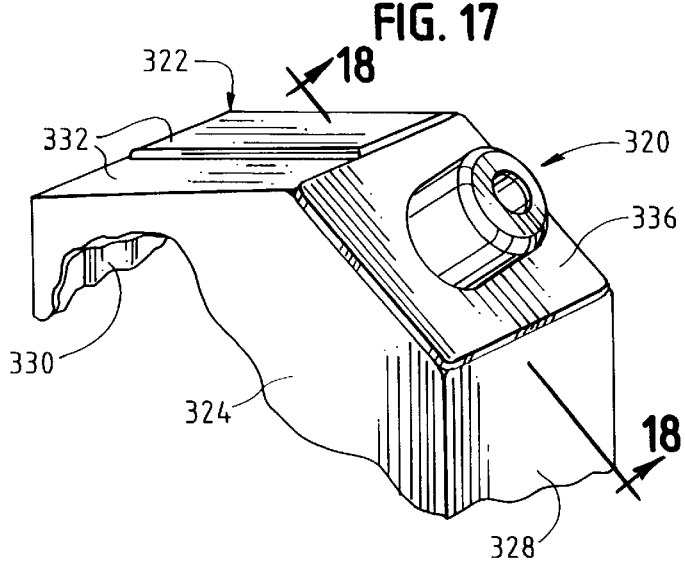
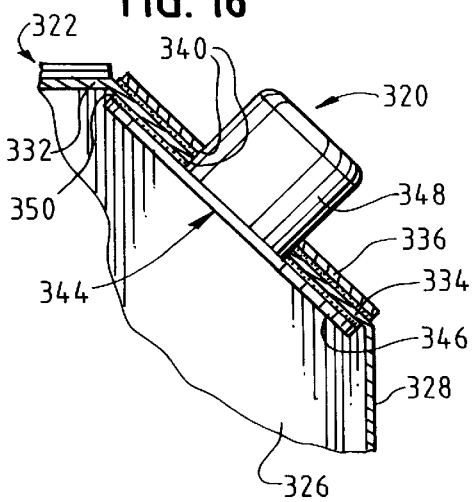
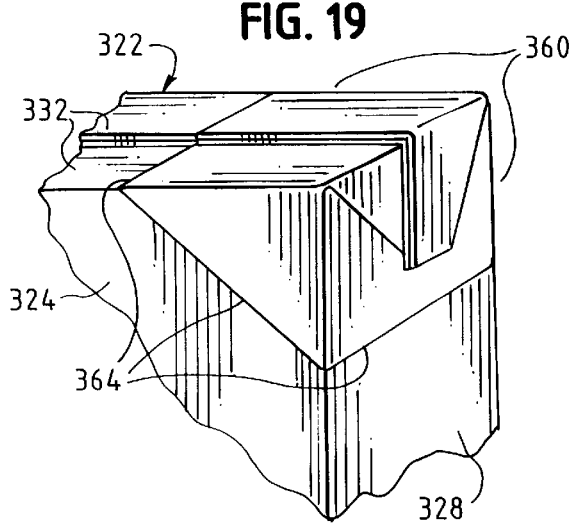

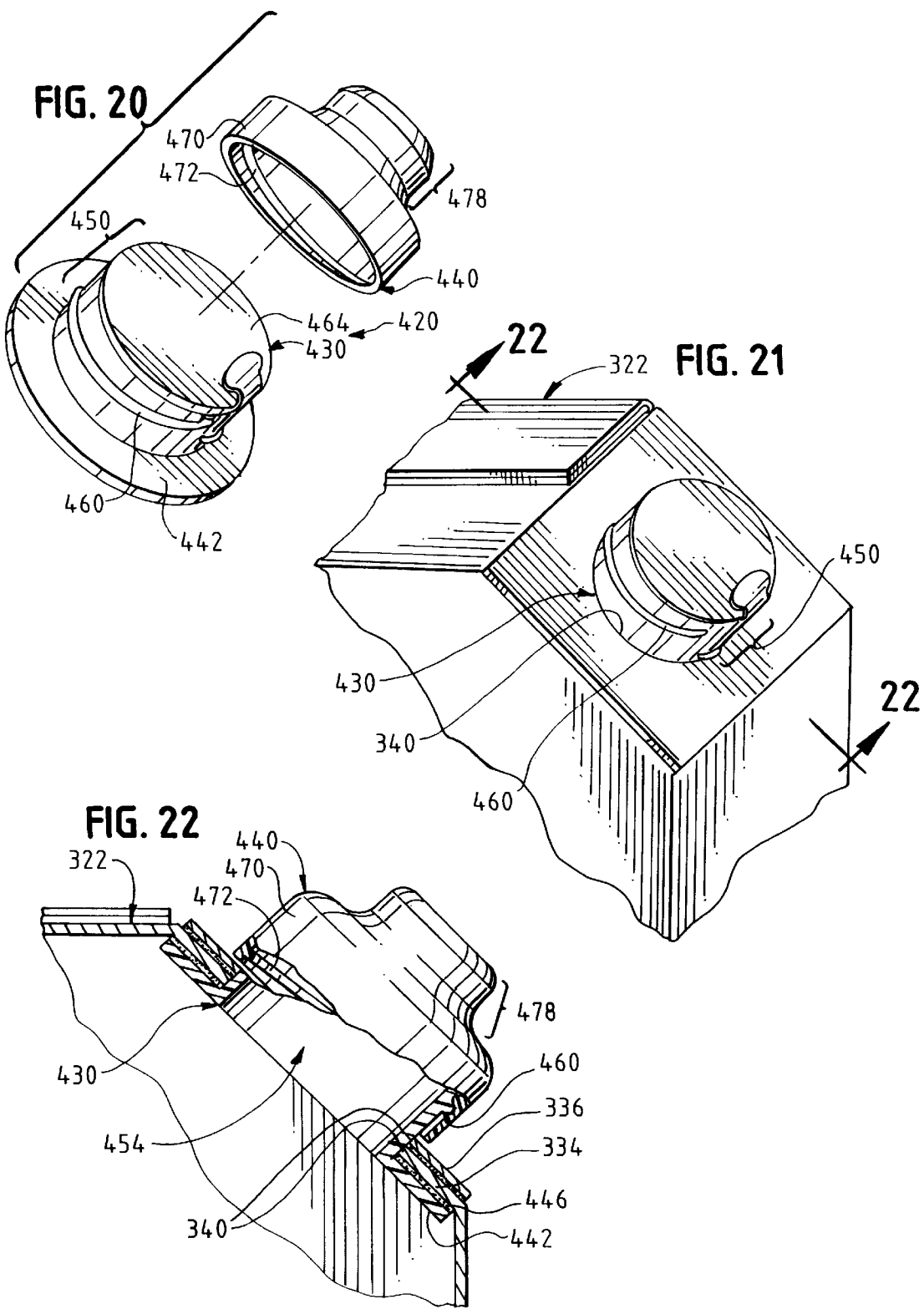

DISPENSING STRUCTURE INCORPORATING A VALVE-CONTAINING FITMENT FOR MOUNTING TO A CONTAINER AND A PACKAGE WITH A DISPENSING STRUCTURE

CROSS REFERENCE TO RELATED APPLICATION(S)

This application is a divisional patent application of U.S. patent application Ser. No. 09/196,301 filed Nov. 19, 1998 now U.S. Pat. No. 6,050,451.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

This invention relates to a system for dispensing a product from a container and also relates to a package incorporating such a system. This invention is more particularly related to a dispensing system incorporating a dispensing valve which is especially suitable for use with a container from which a substance can be discharged from the container through the valve when the interior container pressure is increased.

BACKGROUND OF THE INVENTION AND TECHNICAL PROBLEMS POSED BY THE PRIOR ART

A variety of packages, including dispensing packages or containers, have been developed for food and drink products as well as for personal care products such as shampoo, lotion, and other materials. Such containers typically have an opening in an end on which is mounted a dispensing closure.

One type of dispensing closure for these kinds of containers has a flexible, pressure-openable, self-sealing, slit-type dispensing valve mounted in the closure over the container opening. When the container is squeezed, the valve slits open, and the fluid contents of the container are discharged through the open slits of the valve. The valve automatically closes to shut off fluid flow therethrough upon a decrease of the increased pressure below a threshold value—and the valve closes even if the unsqueezed container is inverted so that the valve is subjected to the weight of the contents within the container.

Designs of closures using such valves are illustrated in the U.S. Pat. Nos. 5,271,531 and 5,033,655. Typically, such closures include a body mounted on the container neck to hold the valve over the container opening.

A lid can be provided for covering the valve during shipping and when the container is otherwise not in use. See, for example, FIGS. 31–34 of U.S. Pat. No. 5,271,531. Such a lid can be designed to prevent leakage from the valve under certain conditions. The lid can also keep dust and dirt from the valve and/or can protect the valve from damage.

The inventor of the present invention has determined that it would be advantageous to provide an improved dispensing structure that incorporates a slit-type dispensing valve and that could be used with food product containers, including thin walled, flexible, collapsible containers, deformable, collapsible paperboard containers, foil pouch-type containers, and the like.

It would be particularly beneficial to provide such an improved dispensing structure that could be sealingly secured to such a container and that could not be removed from such a container without destroying a portion of the container and/or dispensing structure.

It would also be desirable to provide such an improved dispensing structure which could accommodate the use of a tamper-evident freshness seal.

It would also be advantageous to provide an improved package which includes a container and a dispensing structure wherein the dispensing structure could be initially covered and/or hermetically sealed until it is used.

An improved dispensing structure should also accommodate designs which permit incorporation of the dispensing structure as a unitary part, or extension, of the container with a reduced number of components and which also accommodate designs that separately mount the dispensing structure on the container in a secure manner.

It would also be beneficial if such an improved dispensing structure could readily accommodate its manufacture from a variety of different materials.

Further, it would be desirable if such an improved dispensing structure could be provided with a design that would accommodate efficient, high-quality, large volume manufacturing techniques with a reduced product reject rate.

Preferably, the improved dispensing structure should also accommodate high-speed manufacturing techniques that produce products having consistent operating characteristics unit-to-unit with high reliability.

The present invention provides an improved dispensing structure and package which can accommodate designs having the above-discussed benefits and features.

SUMMARY OF THE INVENTION

According to one aspect of the present invention, a dispensing structure is provided for discharging the contents from the interior of a container.

According to one aspect of the present invention, an improved dispensing structure is provided which is especially suitable for use with thin-walled, flexible, collapsible containers. The dispensing structure is adapted to accommodate the discharge of the contents from the interior of the container. Such containers can include pouch-type disposable containers made from thermoplastic film, foil, or multilayer webs consisting of thermoplastic film and foil.

The dispensing structure for such a thin-walled, flexible, collapsible container includes a fitment and a valve disposed within the fitment. The fitment is adapted to be disposed in the opening of the container and extends from the container. The fitment has a peripheral sealing surface that is sealingly bondable to the container around the opening. The fitment defines a dispensing passage for establishing communication between the exterior and interior of the container.

The valve is a flexible valve that is disposed across the fitment dispensing passage. The valve has at least one self-sealing slit. The slit can open to permit flow therethrough in response to increased pressure on the side of the valve facing the interior of the container.

According to another aspect of the invention, a dispensing structure is provided for mounting at an opening defined in a generally planar wall of a container to accommodate discharge of the contents from the interior of the container. The container may be a deformable or collapsible container or may be a container with a substantially rigid portion or portions.

A multi-piece fitment is adapted to be mounted to the container. The fitment includes a base. The fitment base has a flange adapted to be sealingly bonded to the container planar wall portion around the opening defined in the container planar wall. The fitment has a hollow projection that extends from the flange beyond the planar wall portion. The hollow projection defines at least a portion of a dispensing passage for establishing communication between the exterior and interior of the container. The hollow projection also defines an external thread.

A valve carrier is provided for mounting to the fitment base hollow projection. The valve carrier has an internally threaded skirt that is adapted to be threadingly engaged with the hollow projection external thread. The valve carrier has a unitary spout that extends from the skirt and that defines a portion of the dispensing passage.

A flexible valve is disposed within the valve carrier across the dispensing passage. The valve has at least one self-sealing slit which opens to permit flow therethrough in response to increased pressure on the side of the valve facing the interior of the container.

According to yet another aspect of the invention, an improved package is provided with a dispensing structure that is initially covered and hermetically sealed. The package includes a container with an upper end defined at least by (1) two, generally parallel, spaced-apart sidewalls, (2) two, generally parallel, spaced-apart end walls joining the sidewalls, (3) a top wall joining the sidewalls and one of the end walls, and (4) a generally planar corner wall. The corner wall is disposed at an oblique angle to the top wall and end walls. The corner wall joins the top wall, the sidewalls, and one of the end walls. The corner wall also defines an opening to the container interior.

A hollow fitment is sealingly mounted to the corner wall at the opening. The hollow fitment defines a dispensing passage in communication with the interior of the container.

A flexible valve is disposed within the hollow fitment across the fitment dispensing passage. The valve has at least one self-sealing slit which opens to permit flow therethrough in response to increased pressure on the side of the valve facing the interior of the container.

A removable and disposable cover extends from the container over part of the fitment projecting beyond the planar corner wall and over at least a portion of the planar corner wall. The cover defines a hermetically sealed volume around the part of the fitment projecting beyond the planar corner wall.

Another form of a package is provided according to yet another aspect of the invention. The package includes a container in the form of a collapsible pouch defined by at least two opposing, flexible web portions that are sealed together around an interior region which is unsealed and that are separated at a peripheral region to define an opening to the interior region. The package includes a fitment which defines a dispensing passage. The fitment includes a hollow base that has two lateral ends and that defines two generally oppositely facing walls which converge and terminate at each of the two lateral ends. Each wall defines an exterior surface portion that is sealingly secured to one of the web portions along the opening. The fitment hollow base defines at least a portion of the dispensing passage through the fitment, and the fitment includes a spout that extends from the hollow base and that defines at least a portion of the dispensing passage.

A flexible valve is disposed within the hollow fitment across the fitment dispensing passage. The valve has a self-sealing slit which opens to permit flow therethrough in response to increased pressure on the side of the valve facing the interior of the pouch.

The package includes a removable and disposable cover formed as extensions of at least two of the pouch web portions which enclose the fitment spout and which have peripheral portions sealed together to define a hermetically sealed volume around the fitment pouch.

A releasable attachment means is provided for sealingly attaching the pouch to the extensions defining the cover.

The above-described dispensing structures of the present invention can be readily installed on the container by bonding, or otherwise securing, a portion of the fitment to a wall or walls of the container. In some designs, the valve is readily mounted in a separate holder or carrier for subsequently attaching to the fitment. Designs of the dispensing structure of the present invention can minimize, if not substantially eliminate, potential leakage paths.

Such designs also greatly facilitate the dispensing of the contents from the container as well as re-closing of the dispensing structure after some of the contents have been dispensed.

The dispensing structure of the present invention can be readily designed to provide configurations which greatly improve control of the direction of dispensing as well as control of the flow of product from the container. As a result, dispensing structures can be designed in accordance with the teachings of the present invention to provide configurations which are readily manipulated during the dispensing of the product and which are more easily maintained in a generally clean condition without product buildup on the dispensing structure or drips along the exterior surface of the dispensing structure.

Numerous other advantages and features of the present invention will become readily apparent from the following detailed description of the invention, from the claims, and from the accompanying drawing.

BRIEF DESCRIPTION OF THE DRAWINGS

In the accompanying drawings that form part of the specification, and in which like numerals are employed to designate like parts throughout the same.

FIG. 5 is a view similar to FIG. 4, but FIG. 5 illustrates the package after removal of the cover and inversion of the package to dispense product from the package;

FIG. 6 is an enlarged, perspective view of the valve employed in a dispensing structure in the package illustrated in FIGS. 1–5;

FIG. 7 is a top plan view of the valve shown in FIG. 6;

FIG. 8 is a side elevational view of the valve shown in FIGS. 6 and 7;

FIG. 9 is a perspective view of the first embodiment of the fitment of the present invention which is employed in the package illustrated in FIGS. 1–5;

FIG. 10 is a side elevational view of the first embodiment of the fitment illustrated in FIG. 9;

FIG. 11 is a bottom view of the fitment taken generally along the plane 11—11 in FIG. 10;

FIG. 12 is a top plan view of the first embodiment of the fitment taken generally along the plane 12—12 in FIG. 10;

FIG. 13 is a cross-sectional view taken generally along the plane 13—13 in FIG. 12;

FIG. 14 is a cross-sectional view taken generally along the plane 14—14 in FIG. 12;

FIG. 15 is an enlarged view similar to FIG. 14, but FIG. 15 shows the valve mounted in the fitment;

FIG. 16 is a perspective view of a second embodiment of the dispensing structure of the present invention which comprises a separate fitment that is adapted to be mounted on a container and that has a slit-type valve mounted therein;

FIG. 17 is a perspective view of an upper corner of a package consisting of a container with the second embodiment of the dispensing structure shown in FIG. 16 mounted thereon;

FIG. 18 is an enlarged, fragmentary, cross-sectional view taken generally along plane 18—18 in FIG. 17;

FIG. 19 is a view similar to FIG. 17, but FIG. 19 shows a container and the dispensing structure illustrated in FIGS. 16–18 with a removable cover over the dispensing structure to form a complete package according to another aspect of the present invention;

FIG. 20 is an exploded, perspective view similar to FIG. 16, but FIG. 20 shows yet another embodiment of the dispensing structure of the present invention which comprises a separate, multi-piece fitment adapted to be mounted on a container (not illustrated in FIG. 20);

FIG. 21 is a perspective view of an upper corner of a container to which is mounted the base of the multi-piece fitment of the dispensing structure shown in FIG. 20; and FIG. 22 is a cross-sectional view taken generally along the plane 22—22 in FIG. 21;

DESCRIPTION OF THE PREFERRED EMBODIMENTS

While this invention is susceptible of embodiment in many different forms, this specification and the accompanying drawings disclose only some specific forms as examples of the invention. The invention is not intended to be limited to the embodiments so described, however. The scope of the invention is pointed out in the appended claims.

For ease of description, the dispensing structure and package of this invention are described in selected orientations. It will be understood, however, that the dispensing structure and package of this invention may be manufactured, stored, transported, used, and sold in orientations other than the orientations described.

FIGS. 1–15 illustrate one presently preferred embodiment of the present invention in the form of a dispensing structure designated generally by the reference number 20. In this embodiment, the dispensing structure 20 includes separately manufactured components for mounting to a container 22 that holds a liquid product.

A removable and disposable cover 24 extends from the container 22 and may be regarded as a removable part of the dispensing structure 20 or may be regarded as an extension of the container 22. The cover 24 may be formed as a separate article and attached to the container 22 by suitable means, such as connections formed by bonding or sealing which can be broken or torn away when the cover 24 is removed. The cover 24 may also be formed directly as extensions of the materials forming the walls of the container 22, and suitable weakened areas or other means can be provided to accommodate the tearing away of the cover 24.

Figure 2:
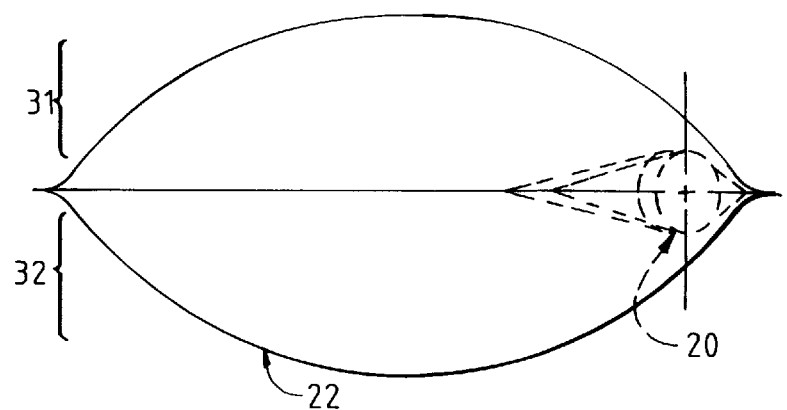
FIG. 2 is a top plan view of the package illustrated in FIG. 1.
Figure 3:
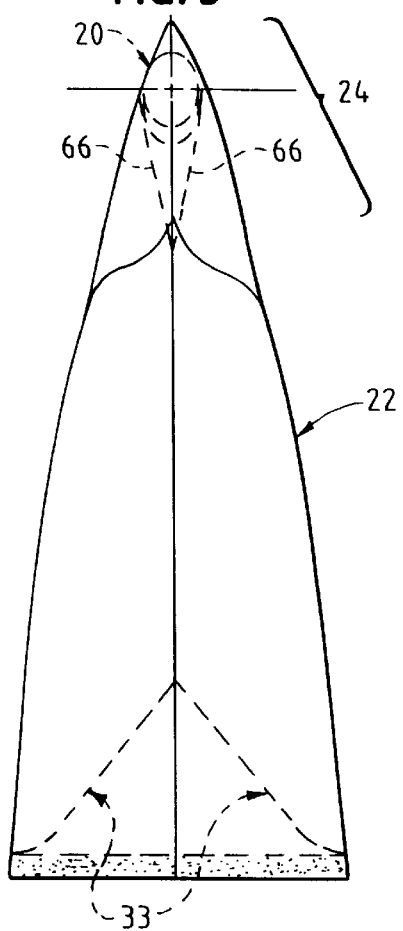
FIG. 3 is an elevational view of the right-hand end of the package illustrated in FIG. 1.

The container 22 is a collapsible pouch that is formed from at least two, opposing, flexible web portions 31 and 32 (FIG. 2). Each web portion 31 and 32 may be a separate sheet or web of material. Alternatively, the web portions 31 and 32 may be a single sheet of material folded over to define the two opposing web portions. In order to provide increased capacity and provide a base for a standup package, an additional web 33 is preferably provided at the lower end of the pouch.

Figure 1:
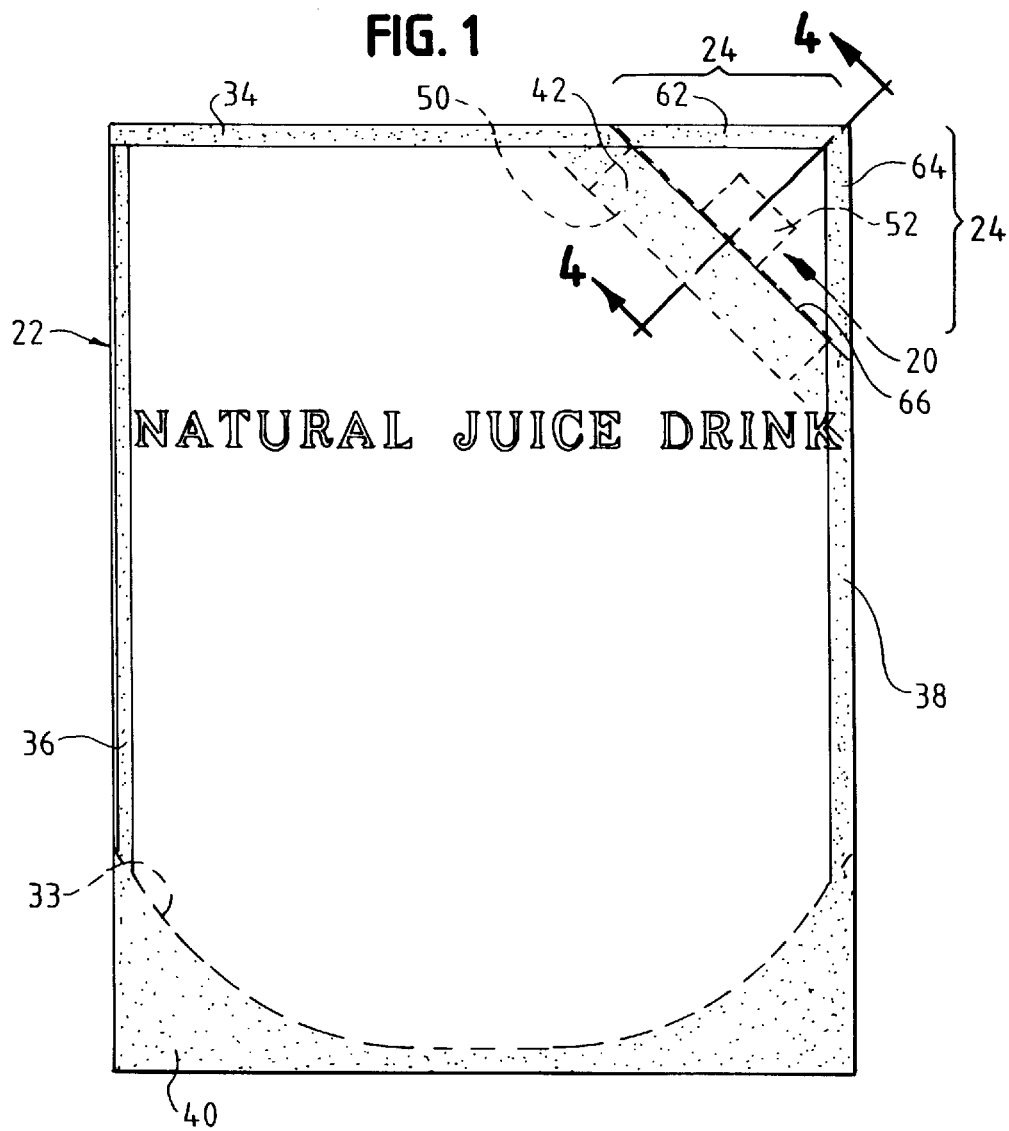
FIG. 1 is a front elevational view of a first embodiment of a package incorporating the dispensing structure of the present invention.

The web portions are sealed together adjacent an unsealed, interior region. Visible in FIG. 1 is a top seal 34, a left side seal 36, a right side seal 38, and a bottom seal 40. Typically, the seals 34, 36, 38, and 40 are heat seals which can be formed by conventional techniques when the pouch web portions include a heat-bondable, thermoplastic material. The web portions may consist of a suitable multi-layer structure or film, such as, for example, an extrusion-laminated film or an adhesive-laminated film. Such a film may have an outer foil layer covered on the pouch interior with a layer of thermoplastic material suitable for being heat-sealed or bonded. Additional internal layers may be included, such as a gas barrier layer, a thermal stability layer, and the like, along with appropriate bonding layers for bonding the various layers together.

Prior to completing the bonding the web portions together to form the pouch, the dispensing structure 20 is located between regions of the web portions 31 and 32. The dispensing structure 20 is sealed to the web portions 31 and 32, as with a heat seal 42 visible in FIG. 1 on one side of the dispensing structure 120. A similar heat seal is formed on the other side of the dispensing structure 20 with the adjacent web portion. The peripheral regions of the web portions 31 and 32 are also sealed together adjacent, and extending from, each end of the dispensing structure 20. The sealing together of the pouch web portions to form the finished pouch occurs in a manner which allows the product to be introduced into the interior volume between the web portions before the sealing of the web portions is completed. This may be effected according to conventional processes, the details of which form no part of the present invention.

Figure 4:
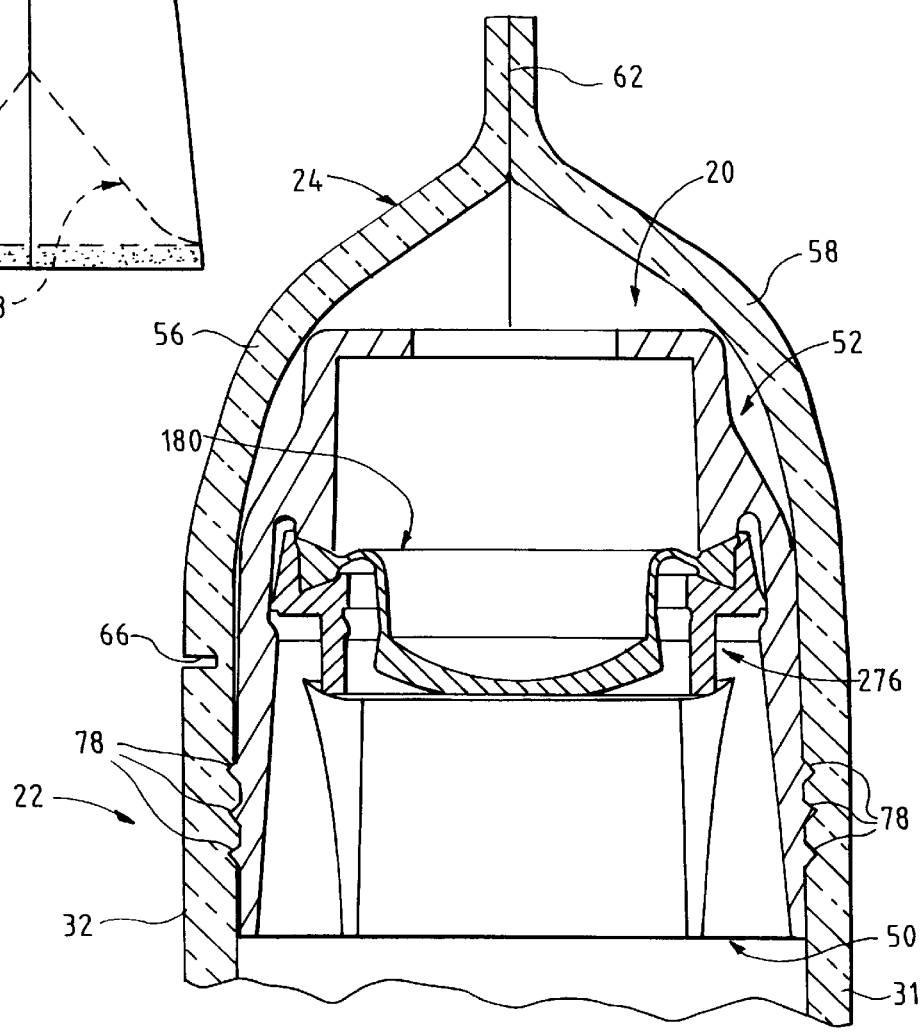
FIG. 4 is a greatly enlarged, fragmentary, cross-sectional view taken generally along the plane 4—4 in FIG. 1.

The dispensing structure 20 includes a unitary fitment having a hollow base 50 and a spout 52 which extends from the hollow base 50 (FIG. 9). As seen in FIGS. 1 and 4, the base 50 is disposed between the pouch web portions 31 and 32 where the base 50 is sealed to the web portions. The web portions 31 and 32 may be characterized as defining an opening in which the fitment base 50 is disposed. In the embodiment of the pouch illustrated in FIG. 1, the web portions 31 and 32 may be more particularly characterized as each having a generally right rectangular configuration generally defining three right angle corners and one mitered corner. The fitment base 50 is disposed in the pouch opening at the mitered corner and sealed to the web portions 31 and 32 along the margin of the mitered corner.

As seen in FIG. 4, the pouch web portion 32 includes an extension 56, and the pouch web portion 31 includes an extension 58. The extensions 56 and 58 together enclose the fitment spout 52 which have peripheral margins sealed together at seals 62 and 64 (FIG. 1) to form the cover 24 defining a hermetically sealed volume around the fitment spout 20.

The cover 24, comprising the peripherally sealed extensions 56 and 58, is removable and disposable. To this end, the extensions 56 and 58 are connected to the pouch web portions 32 and 31, respectively, with weakened frangible regions, such as a partial perforation or perforations 66 (FIG. 4) along the edges of the cover 24 adjacent the pouch 22. The partial perforations 66 may be provided in a conventional manner as spaced-apart lengths of short grooves or score lines. Alternatively, a single, continuous groove may be provided in each side of the pouch 22. When the upper end of the cover 24 is grasped and pulled by the user, the cover tears and breaks away from the pouch 22 along the perforation or perforations 66. The fitment spout 52 is then exposed at the corner of the pouch 22. If desired, other systems may be provided for attaching the cover to the pouch. For example, the cover 24 may be attached to the pouch 22 with a tear-away band (not illustrated).

FIGS. 9–14 illustrated the details of the structure of the fitment 20. The fitment base 50 may be characterized as having a "boat"-shaped configuration. The fitment base 50 has two, generally oppositely facing walls 70 and 72 (FIG. 9) which converge and terminate at each of two lateral ends 74 and 76 (FIG. 9). Each wall 70 and 72 defines an exterior surface portion for being sealingly secured to one of the pouch web portions. In particular, each wall 70 and 72 includes three, spaced-apart, parallel ribs 78. Each rib 78 has a generally triangular transverse cross section as can be seen in FIG. 14. The ribs 78 function to enhance the securement of the fitment 20 to the web portions 31 and 32 of the pouch 22. The ribs 78 are particularly effective in enhancing the sealing capability between the fitment 20 and the pouch web portions 31 and 32 when the fitment 20 is heat-bonded to the web portions 31 and 32.

The fitment base 50 could have a configuration other than a "boat" shape. The ribs 78 could have a transverse cross section that is not triangular. There could be more than three ribs or fewer than three ribs. The ribs 78 could be eliminated entirely.

It is presently contemplated that the fitment 20, or at least the base 50, will be preferably fabricated from a thermoplastic material such as polyethylene, polypropylene, ABS, styrene, or the like. It is presently contemplated that the fitment 20 will be molded as a unitary structure, preferably of polyethylene or polypropylene. Heat-bonding of the fitment 20 to the pouch web portions 31 and 32 may be effected with any of a number of conventional methods, such as heat induction, ultrasonic welding, friction welding, and the like (the details of which form no part of the present invention). Alternatively, the fitment 20 could be secured to the pouch web portions 31 and 32 with adhesive or with an interference attachment structure (not illustrated).

As can be seen in FIG. 9, the fitment base 50 includes an internal conduit structure 82 defining at least a portion of a dispensing passage 84. As can be seen in FIG. 13, the spout 52 also defines at least a portion of the dispensing passage 84. The spout 52 extends above a flat deck 88 which defines the top of the hollow base 50. At an elevation above the deck 88, the interior of the spout 52 has an inner, annular shoulder defining a frustoconical seating surface 90. The upper end of the spout 52 defines a discharge orifice 92 (FIG. 13). As illustrated in FIG. 15, the dispensing structure 20 includes a valve 180 which is mounted in the fitment spout 52.

The preferred embodiment of the valve 180 is designed to be effectively clamped in position on the fitment seating surface 90 (FIGS. 2 and 5) by a retaining ring 276 (FIG. 15). In the preferred form of the valve 180 illustrated, the valve 180 is of a known design employing a flexible, resilient material, which can open to dispense fluid. The valve 180 may be fabricated from thermosetting elastomeric materials such as silicone, natural rubber, and the like. It is also contemplated that the valve 180 may be fabricated from thermoplastic elastomers based upon materials such as thermoplastic propylene, ethylene, urethane, and styrene, including their halogenated counterparts.

A valve which is similar to, and functionally analogous to, valve 180 is disclosed in the U.S. Pat. No. 5,439,143. However, the valve 180 has a peripheral flange structure (described in detail hereinafter) which differs from the flange structure of the valve shown in the U.S. Pat. No. 5,439,143. The description of the valve disclosed in the U.S. Pat. No. 5,439,143 is incorporated herein by reference to the extent pertinent and to the extent not inconsistent herewith.

As illustrated in FIGS. 6–8, the valve 180 includes a flexible, central portion, wall, or face 264 which has a concave configuration (when viewed from the exterior) and which defines two, mutually perpendicular, intersecting, dispensing slits 266 of equal length. The intersecting slits 266 define four, generally sector-shaped, flaps or petals in the concave, central wall 264. The flaps open outwardly from the intersection point of the slits 266, in response to increasing container pressure of sufficient magnitude, in the well-known manner described in the U.S. Pat. No. 5,439, 143.

The valve 180 includes a skirt 268 (FIG. 8) which extends outwardly from the valve central wall or face 264. At the outer (upper) end of the skirt 268 there is a thin, annular flange 270 which extends peripherally from the skirt 268 in an angled orientation. The thin flange 270 terminates in an enlarged, much thicker, peripheral flange 272 which has a generally dovetail shaped transverse cross section.

To accommodate the seating of the valve 180 in the fitment spout 52, the attachment region or seating surface 90 has the same angle as the angle of the valve flange dovetail configuration. The upper surface of the valve flange 272 is disposed against the spout seating surface 90 as shown in FIG. 15.

The lower surface of the valve flange 272 is clamped by the retaining ring 276. As illustrated in FIG. 15, the retaining ring 276 includes an upwardly angled clamping surface 278. When the retaining ring 276 is mounted in the spout 52, the spacing between the clamping surface 278 of the retaining ring 276 and the spout seating surface 90 (FIG. 15) increases with increasing radial distance from the center of the valve 180. Such a configuration defines an annular cavity with a transverse cross section having a dove-tail shape which generally conforms to the dove-tail shape of the valve flange 272.

The retaining ring 276 includes an outer annular wall 280 (FIG. 15) with a radially outwardly extending bead 282. When the retaining ring 276 is mounted in the spout 52 (FIG. 15), the retaining ring bead 282 is received in an undercut region 286 of the spout 52 in a snap-fit engagement. This arrangement securely clamps and holds the valve 180 without requiring special internal support structures or bearing members adjacent the interior surface of the valve cylindrical skirt 268. This permits the region adjacent the interior surface of the valve cylindrical skirt 268 to be substantially open, free, and clear so as to accommodate movement of the valve skirt 268.

If desired, the valve 180 could be retained in the spout 52 without the retaining ring 276. For example, the valve 180 could be bonded to the spout 52 with adhesive or could be directly molded onto the spout 90 so as to create a weld defined by interface solidification of melted portions of the materials.

The valve 180 could be molded with the slits 266. Alternatively, the valve slits 266 could be subsequently cut into the wall or face 264 of the valve 80 by suitable conventional techniques.

When the valve 180 is properly mounted within the spout 52 as illustrated in FIG. 15, the central wall or face 264 of the valve 180 lies recessed within the spout 52. However, when the pouch 22 is squeezed to dispense the contents through the valve 180 (as described in detail in the U.S. Pat. No. 5,439,143), the valve central wall or face 264 is forced outwardly from its recessed position toward the discharge end of the spout 52.

In order to dispense product from the pouch 22, the cover 24 must be initially removed by tearing the cover 24 away along the weakened line defined by the partial perforation or perforations 66 (FIGS. 1 and 4). FIG. 5 illustrates the package after the cover 24 has been torn away to expose the spout 52 and after the package has been inverted to facilitate dispensing of the product.

The pouch 22 is typically inverted and squeezed to increase the pressure within the pouch 22 above the ambient exterior atmospheric pressure. This forces the product within the pouch 22 toward the valve 180 and forces the valve 180 from the recessed or retracted position (illustrated in FIG. 4) toward the outwardly extending position (FIG. 5). The outward displacement of the central face 264 of the valve 180 is accommodated by the relatively, thin, flexible, skirt 268. The skirt 268 moves from an inwardly projecting, rest position to an outwardly displaced, pressurized position, and this occurs by the skirt 268 "rolling" along itself outwardly toward the end of the spout 52 (toward the position shown in FIG. 5). However, the valve 180 does not open (i.e., the slits 266 do not open) until the valve central face 264 has moved substantially all the way to a fully extended position in the dispensing passage 84. Indeed, as the valve central wall 264 initially begins to move outwardly, the valve central wall 264 is initially subjected to radially inwardly directed compression forces which tend to further resist opening of the slits 266. Also, the valve central wall 264 generally retains its inwardly concave configuration as it moves outwardly and even after it reaches the fully extended position. However, when the internal pressure becomes sufficiently high after the valve central wall 264 has moved outwardly to the fully extended position, the slits 266 of the valve 180 begin to open to dispense product (FIG. 5). The product is then expelled or discharged through the open slits 266. For illustrative purposes, FIG. 5 shows drops 280 of a liquid product being discharged.

FIGS. 16–18 illustrate another form of a dispensing structure of the present invention which is designated generally in FIGS. 16–18 by the reference number 320. The dispensing structure 320 is adapted to be mounted to a suitable container, such as the container 322 illustrated in FIGS. 17 and 18. Together the dispensing structure 320 and container 322 may be characterized as defining a package in accordance with another aspect of the present invention.

The container 322 includes two generally parallel, spaced-apart sidewalls, a first sidewall 324 (FIG. 17) and a second sidewall 326 (FIG. 18). The container 322 includes two generally parallel, spaced-apart end walls, a first end wall 328 (FIG. 17) and a second end wall 330 (FIG. 17). The end walls 328 and 330 join the sidewalls 324 and 326. A top wall 332 (FIG. 17) joins the sidewalls 324 and 326 and the end wall 330.

The container 322 includes a generally planar corner wall 334 (FIG. 18). A re-enforcing member 336 is provided on top of the planar corner wall 334. The reenforcing member 336 is an optional feature which may be omitted.

The upper end of the container 322 illustrated in FIGS. 17 and 18 defines a generally right rectangular prism with a mitered corner defined by the angled corner wall 334. The bottom portion of the container 322 which is not visible in FIGS. 17 and 18 may have a substantially right rectangular prism shape and a bottom wall (not illustrated) so that the whole package has a substantially regular parallelpiped configuration, except at the corner wall 334. Alternatively, the bottom portion of the container 322 may have any other suitable configuration which can extend from, and merge with, the upper portion sidewalls 324 and 326 and end walls 328 and 330. Further, in other alternate embodiments, the entire package may have an overall configuration that differs from the configuration of a regular parallelpiped configuration.

The container 322 may be fabricated from materials which are somewhat stiff and which allow the container 322 to maintain its three-dimensional configuration when it is full of a product or after it is empty. Preferably, however, at least the sidewalls 324 and 326 are somewhat flexible to allow them to be squeezed inwardly to pressurize the container interior. Preferably, the container 322 is fabricated from a paperboard material which may be coated on the inside with a thermoplastic liner or with a wax material which facilitates long-term storage of a liquid product within the container 322.

The container planar corner wall 334 and the re-enforcing member 336 together define an opening 340 (FIG. 18). The opening 340 establishes communication between the container interior and exterior, and the opening 340 receives a portion of the dispensing structure 320 which includes a hollow fitment 344 having an annular flange 346 and a spout 348 projecting outwardly from the flange 346.

Before the container 322 is completely formed, the fitment 344 is disposed in the opening 340 in the corner wall 334 and sealed to the inside of the wall 334. FIG. 18 shows an annular seal 350 securing the flange 346 to the container corner wall 334. The seal 350 may be a heat seal, adhesive, or other suitable means for sealingly securing the fitment 344 to the container corner wall 334.

When the fitment 344 is properly mounted in the container corner wall 334, the spout 348 extends through the container opening 340. The interior of the spout 348 has substantially the same configuration as the interior of the spout 52 described above with reference to FIG. 15. Thus, the spout 348 includes an internal seating surface (not visible in FIGS. 16–18, but similar to the seating surface 90 illustrated in FIG. 15 for the spout 52). Clamped against the seating surface inside the spout 348 is a dispensing valve which is identical with the valve 180 described above with reference to FIG. 15. The valve is secured across the internal dispensing passage of the spout 348 and is retained therein by suitable means. Such a suitable valve retention means can include a clamping ring (such as the clamping ring 276 described above with reference to FIG. 15), adhesive, a thermal bond, a mechanical interlock, etc. The valve and the fitment 344 together constitute the dispensing structure 320.

After the dispensing structure 320 is properly mounted in the container end wall 334, the various portions of the container are oriented and configured to define an interior volume for receiving a liquid product prior to complete closure of the container 322 walls. After an interior volume of the partially completed container 322 is filled with product, a remaining wall portion or portions are moved into position to close the container and are sealed in place by suitable conventional techniques, the details of which form no part of the present invention.

According to yet another aspect of the present invention, a cover 360 is provided on the container 322 over the container corner wall as shown in FIG. 19. The cover has the configuration of a hollow-triangular prism. The cover 360 is releasably attached to the container 322 so that it can be removed by the user to expose the dispensing structure spout 348. In one presently contemplated preferred embodiment, the cover is defined by integral extensions of the material which forms the top wall 332, the end wall 328, and the two sidewalls 324 and 326. The cover 360 defines a hermetically sealed volume around the spout 348 projecting beyond the corner wall 334. In an alternate design (not illustrated) the cover 360 could be a separate component secured to the container 322.

A releasable attachment means is provided in the form of a weakened frangible region 364 along the edges of the cover 360 adjacent the planar corner wall 334 underneath the cover 360. The weakened frangible regions 364 may include a score or groove partially through the material or a plurality of spaced-apart, partial perforations in the material. Other suitable, weakened structures or rupturable structures may be provided for enabling the user to readily remove the cover 360.

FIG. 20 shows another embodiment of a dispensing structure 420 of the present invention which may be mounted to a container 322 which is identical with the container 322 described above with reference to FIGS. 17–18.

With reference to FIG. 20, the dispensing structure is a multi-piece fitment comprising a base 430 and a valve carrier 440 which are adapted to be assembled together. Prior to assembly, the base 430 is mounted in the opening 340 of the container 322 (FIG. 22). Subsequently, the valve carrier 440 is mounted to the end of the base 430. The base 430 has a flange 442 adapted to be sealingly bonded to the container planar wall or wall portion 334 as shown in FIG. 22. The flange is especially suitable for being sealingly bonded with a seal 446 to the container corner wall 334. The seal or bond may be an adhesive bond or a heat seal. The heat seal may be effected by conventional or special processes employing heat induction, ultrasonic welding, friction welding, and the like. In some applications, it may be desirable to provide a mechanical engagement or interference attachment that has a leak-tight construction.

The base 430 includes a hollow projection 450 (FIGS. 20 and 21) extending from the flange 442. The hollow projection 450 defines at least a portion of a dispensing passage 454 (FIG. 22) for establishing communication between the exterior and interior of the container. The exterior of the hollow projection 450 defines an external thread 460. The upper end of the hollow projection 450 preferably defines an outer annular end which is adapted to receive a membrane, release paper, or foil 464. The membrane 464 is releasably secured across the outer annular end of the hollow projection 450 to sealingly occlude the portion of the dispensing passage 454 defined by the hollow projection 450.

The valve carrier 440 includes a skirt 470 (FIGS. 20 and 22). The skirt 470 has an internal female thread 472 for threadingly engaging the external thread 460 on the base hollow projection 450. The valve carrier 440 has a unitary spout 478 extending from the skirt 470. The spout 478 has an interior configuration substantially identical with the interior configuration of the fitment spout 52 described above with reference to FIG. 15. The interior of the spout 478 thus includes an annular valve seat (not visible in FIGS. 20–22, but identical with the valve seat 90 described above with reference to FIG. 15). A flexible valve (identical with the valve 180 described above with reference to FIG. 15) is mounted to the valve seat within the spout 478 and is held therein by means of a retaining ring (identical with the retaining ring 276 described above with reference to FIG. 15). The valve within the spout 478 is thus sealing secured across the dispensing passage defined by the spout. Other suitable retention systems could be employed, including adhesive securement, thermal bonding, and the like.

The valve carrier 440, with the valve secured therein, is threadingly mounted to the fitment base projection 450 after the fitment base projection 450 has been installed in the wall of the container 322. Initially, the membrane or release foil 464 is left in place as a freshness seal and/or tamper indicator. Prior to completing the fabrication of the container 322, an interior volume of the container 322 is filled with product. Subsequently, the fabrication of the container 322 is completed by closing over portions of the container in a sealed closed relationship to form a complete package.

To use the package, the user initially unscrews the valve carrier 340 from the fitment hollow projection 450. The user then removes membrane 464 to open the dispensing passage 454. Finally, the valve carrier 440 is reinstalled on the fitment hollow projection 450. The container 322 can then be inverted to dispense product through the dispensing structure. One or more walls of the container 322 may be squeezed or deflected inwardly to force the liquid through the valve within the spout 478.

The dispensing structures and packages of the present invention permit a product to be dispensed by the user under controlled conditions. The amount of pressure exerted on the liquid product within the container can be controlled as necessary to effect the opening or closing of the valve within the dispensing structure.

The exposed surfaces of the package, including the dispensing structure, will remain cleaner during the use life of the package because the user can provide a more accurate product flow and because the user can more accurately control the direction of dispensing.

The dispensing structure of the present invention accommodates a package configuration that prevents air from re-entering the package, and this reduces the opportunity for contamination or for air-induced deterioration of the product within the package. Further, a membrane or liner sealingly secured across the discharge passage of the dispensing structure can be reused as a means for reclosing and sealing the package prior to handling or transporting the container.

In some applications, it may be desirable to provide an exterior lid for the fitment spout, either connected by a hinge or as a separate structure. However, the illustrated preferred forms of the system of the present invention are aesthetically pleasing, in part, because they have no lid which remains attached during dispensing and which could interfere with the dispensing of the product from the container. Additionally, because there is no exterior lid in the preferred embodiments, the user's view of the dispensing process is not obscured.

It will be readily observed from the foregoing detailed description of the invention and from the illustrations thereof that numerous other variations and modifications may be effected without departing from the true spirit and scope of the novel concepts or principles of this invention.

What is claimed is:

1. A package comprising:

a container with an upper end defined at least by
- (A) two generally parallel, spaced-apart, sidewalls,
- (B) two generally parallel, spaced-apart end walls joining said sidewalls,
- (C) a top wall joining said sidewalls and one of said end walls, and
- (D) and a generally planar corner wall that
  - (1) is disposed at an oblique angle to said top wall and end walls,
  - (2) joins said top wall, said sidewalls, and one of said end walls, and
  - (3) defines an opening to the container interior;

a hollow fitment sealingly mounted to said corner wall at said opening and defining a dispensing passage in communication with the interior of said container;

a flexible valve that
- (A) is disposed within said hollow fitment across said fitment dispensing passage, and
- (B) has a self-sealing slit which opens to permit flow therethrough in response to increased pressure on the side of said valve facing the interior of said container;

a removable and disposable cover extending from said container over the part of said fitment projecting beyond said planar corner wall to define a hermetically sealed volume around the part of said fitment projecting beyond said planar corner wall; and releasable attachment means for sealingly attaching said cover to said container.

2. The package in accordance with claim 1 in which said end walls, sidewalls, and top wall each comprises a web of material;

said cover includes an integral extension of said material from said top wall, said sidewalls, and one of said end walls beyond said planar corner wall; and said releasable attachment means includes weakened, frangible regions along edges of said cover adjacent said planar corner wall.

3. The package in accordance with claim 2 in which said frangible regions include partial perforations in said extension of said material along said edges of said top wall, said sidewalls, and one of said end walls.

4. The package in accordance with claim 1 in which said cover has the configuration of a hollow, triangular prism.

5. The package in accordance with claim 1 in which said fitment includes an annular flange heat sealed to said planar corner wall on the interior of said container;

said fitment has an outer annular end; and a membrane is releasably secured across said outer annular end to sealingly occlude said dispensing passage.

6. A package comprising:

a container with an upper end defined by at least one wall that defines an opening to the container interior, said container including two end walls, two sidewalls, and a top wall wherein said at least one wall is a corner wall that is generally planar and that joins said top wall, said sidewalls, and one of said end walls;

a hollow fitment sealingly mounted to said one wall at said opening and defining a dispensing passage in communication with the interior of said container;

a flexible valve that
- (A) is disposed within said hollow fitment across said fitment dispensing passage, and
- (B) has a self-sealing slit which opens to permit flow therethrough in response to increased pressure on the side of said valve facing the interior of said container, a removable and disposable cover extending from said container over the part of said fitment projecting beyond said at least one wall to define a hermetically sealed volume around the part of said fitment projecting beyond said at least one wall, said cover including an integral extension of said material from said top wall, said sidewalls, and one of said end walls beyond said corner wall; and releasable attachment means for sealingly attaching said cover to said container, said releasable attachment means includes weakened, frangible regions along edges of said cover adjacent said corner wall.

7. The package in accordance with claim 6 in which said frangible regions include partial perforations in said extension of said material along said edges of said top wall, said sidewalls, and one of said end walls.

8. The package in accordance with claim 6 in which said cover has the configuration of a hollow, triangular prism.

9. The package in accordance with claim 6 in which said fitment includes an annular flange heat sealed to said at least one wall on the interior of said container; and said fitment has an outer annular end.

* * * * *